US012422872B2

(12) United States Patent
Ravezzi

(10) Patent No.: US 12,422,872 B2
(45) Date of Patent: Sep. 23, 2025

(54) FAST SETTLING VOLTAGE REGULATOR

(71) Applicant: Advanced Micro Devices, Inc., Santa Clara, CA (US)

(72) Inventor: Luca Ravezzi, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 282 days.

(21) Appl. No.: 18/192,560

(22) Filed: Mar. 29, 2023

(65) Prior Publication Data

US 2025/0208640 A1 Jun. 26, 2025

(51) Int. Cl.
*G05F 3/24* (2006.01)
*G05F 1/565* (2006.01)
*G05F 1/575* (2006.01)
*G05F 3/26* (2006.01)

(52) U.S. Cl.
CPC .............. *G05F 1/575* (2013.01); *G05F 1/565* (2013.01); *G05F 3/247* (2013.01); *G05F 3/262* (2013.01)

(58) Field of Classification Search
CPC ........... G05F 1/565; G05F 3/247; G05F 3/262
See application file for complete search history.

(56) References Cited

U.S. PATENT DOCUMENTS

| | | | | |
|---|---|---|---|---|
| 10,545,523 | B1 * | 1/2020 | Wu | G05F 1/595 |
| 11,003,202 | B2 * | 5/2021 | Golara | G05F 1/575 |
| 11,146,262 | B1 * | 10/2021 | Wang | H03K 17/162 |
| 11,300,985 | B2 * | 4/2022 | Fort | G05F 1/445 |
| 2015/0301540 | A1 * | 10/2015 | Shukla | G05F 1/56 327/540 |
| 2023/0045744 | A1 * | 2/2023 | Jung | G11C 11/4093 |
| 2023/0396246 | A1 * | 12/2023 | Chen | H03K 17/6872 |
| 2024/0143007 | A1 * | 5/2024 | Kathuria | G05F 1/59 |
| 2024/0178753 | A1 * | 5/2024 | Xu | G05F 1/56 |

* cited by examiner

*Primary Examiner* — Sisay G Tiku
(74) *Attorney, Agent, or Firm* — Greenberg Traurig, LLP

(57) ABSTRACT

The disclosed voltage regulator circuit includes an NMOS as the main power device that is coupled to a regulated voltage output. A sensing circuit senses the regulated voltage output, and a reference voltage circuit supplies a correct bias to the flipped-source follower, which amplifies the sensed voltage output. A voltage inversion circuit such as a current mirror provides an inverting gain stage for the sensed voltage output, for driving the NMOS. Various other methods, systems, and computer-readable media are also disclosed.

20 Claims, 3 Drawing Sheets

FAST SETTLING VOLTAGE REGULATOR

BACKGROUND

With increasing advancements in computing performance brought on by advances in computing architectures, power management of computing architectures is increasingly important, including for delivering power as needed as well as for protecting circuits and components. A voltage regulator circuit can maintain a constant voltage automatically, correcting for spikes and/or drops in voltage. Accordingly, a fast-settling voltage regulator is desirable. However, certain restrictions, such as a size (e.g., area or footprint) restriction and/or an overhead current limitation can restrict design considerations of voltage regulators for improved performance.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
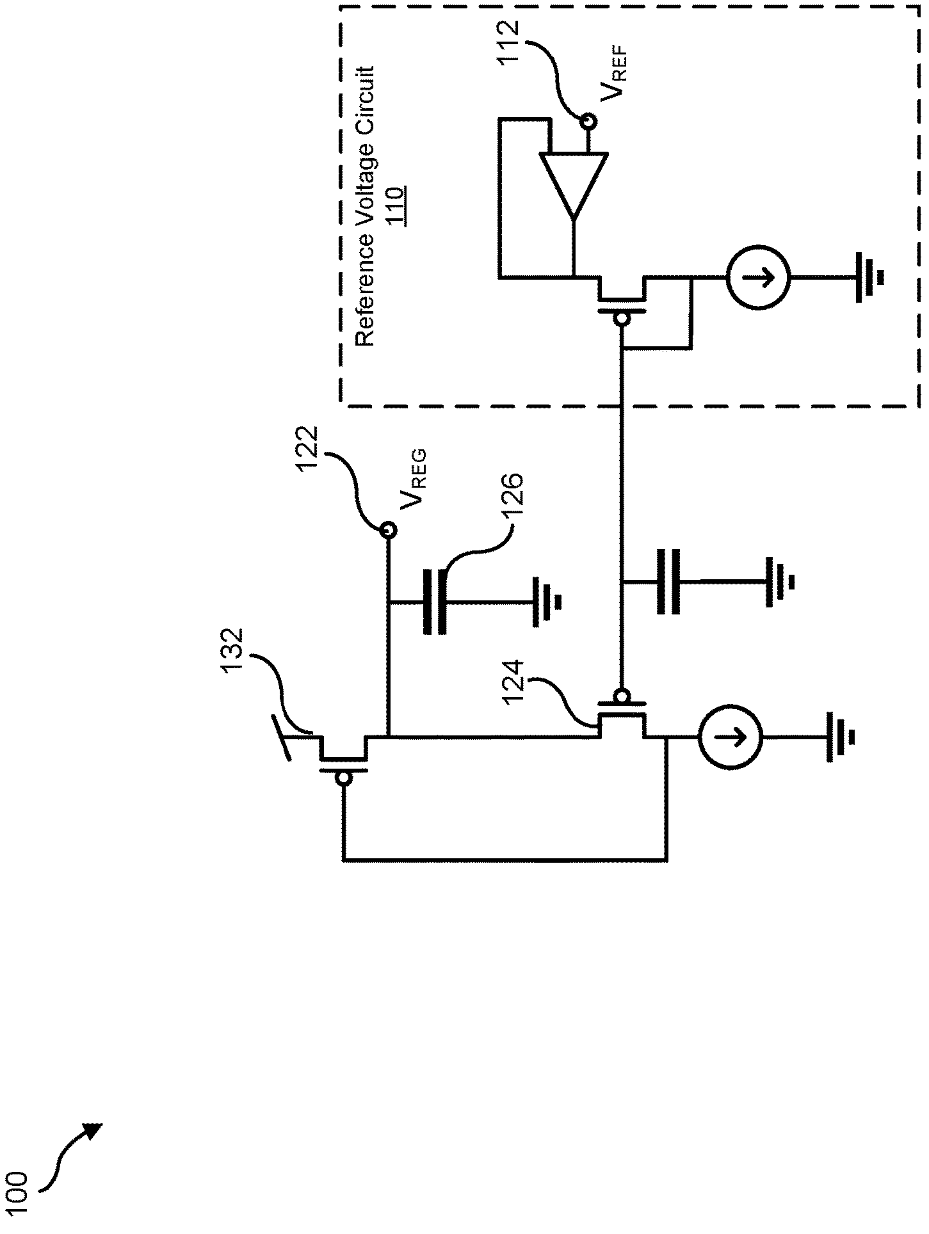
FIG. 1 PRIOR ART
FIG. 1 is a simplified circuit diagram of an example voltage regulator circuit.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to a voltage regulator circuit with fast settling and a good power supply rejection ratio (PSRR) that satisfies size and overhead current constraints. PSRR can refer to a capability of a circuit to suppress power supply variations to its output signal. As will be explained in greater detail below, implementations of the present disclosure provide a fast settling voltage regulator circuit that can use a negative-channel metal-oxide semiconductor (NMOS) for outputting a regulated voltage, rather than being restricted to a positive-channel metal-oxide semiconductor (PMOS) and further without requiring a large capacitor at the output. In other words, rather than having to use a PMOS as the main power device for providing current to the load and setting a regulated supply (e.g., voltage), the present disclosure allows using an NMOS as the main device. To incorporate the NMOS, the voltage regulator circuit includes a reference voltage circuit and a voltage inversion circuit coupled between the reference voltage circuit and the NMOS. The NMOS-based voltage regulator circuit provides better isolation than PMOS-based voltage regulators.

In one implementation, a voltage regulator circuit includes a negative-channel metal-oxide semiconductor (NMOS) coupled to a regulated voltage output of the voltage regulator circuit, a sensing circuit for sensing the regulated voltage output, a reference voltage circuit for supplying a correct bias voltage to the sensing circuit, and a voltage inversion circuit coupled between the sensing circuit and the NMOS.

In some examples, the sensing circuit includes a flipped-source follower circuit coupled between the voltage inversion circuit and the reference voltage circuit and is configured to amplify the sensed regulated voltage output. In some examples, the flipped-source follower circuit comprises a positive-channel metal-oxide semiconductor (PMOS).

In some examples, the flipped-source follower circuit is configured to invert the reference voltage supplied by the reference voltage circuit. In some examples, the voltage inversion circuit is configured to invert the inverted reference voltage from the flipped-source follower circuit.

In some examples, the voltage inversion circuit comprises a current mirror that provides an inverting gain stage for the sensed regulated voltage output. In some examples, the current mirror corresponds to an NMOS-based current mirror.

In some examples, the NMOS is directly coupled to the regulated voltage output. In some examples, the regulated voltage output at the NMOS is not coupled to a capacitor.

In one implementation, a device for voltage regulation includes a negative-channel metal-oxide semiconductor (NMOS) coupled to a regulated voltage output of a voltage regulator circuit, a flipped-source follower circuit coupled between a reference voltage circuit and the NMOS for sensing the regulated voltage output, the reference voltage circuit for supplying a correct bias to the flipped-source follower circuit, and a voltage inversion circuit coupled between the flipped-source follower circuit and the NMOS.

In some examples, the flipped-source follower circuit comprises a positive-channel metal-oxide semiconductor (PMOS). In some examples, the flipped-source follower circuit is configured to invert the reference voltage supplied by the reference voltage circuit.

In some examples, the voltage inversion circuit is configured to invert the inverted reference voltage from the flipped-source follower circuit. In some examples, the voltage inversion circuit comprises a current mirror providing an inverting gain stage of the sensed regulated voltage output. In some examples, the current mirror corresponds to an NMOS-based current mirror.

In some examples, the NMOS is directly coupled to the regulated voltage output. In some examples, the regulated voltage output at the NMOS is not coupled to a capacitor.

In one implementation, a method for voltage regulation includes (i) sensing, by a sensing circuit coupled between a reference voltage circuit for supplying a reference voltage and a voltage regulator circuit comprising a negative-channel metal-oxide semiconductor (NMOS) directly coupled to a voltage output of the voltage regulator circuit, the voltage output, (ii) providing an inverted signal by inverting and amplifying, via a voltage inversion circuit coupled between the sensing circuit and the NMOS, the sensed voltage output from the sensing circuit, and (iii) outputting, via the NMOS, a regulated voltage output based on the inverted signal.

In some examples, the method includes supplying, by the reference voltage circuit, a correct bias to the sensing circuit. In some examples, the method includes further comprising amplifying without inverting, by the sensing circuit, the sensed voltage output.

Features from any of the implementations described herein can be used in combination with one another in accordance with the general principles described herein. These and other implementations, features, and advantages will be more fully understood upon reading the following detailed description in conjunction with the accompanying drawings and claims.

Figure 2:
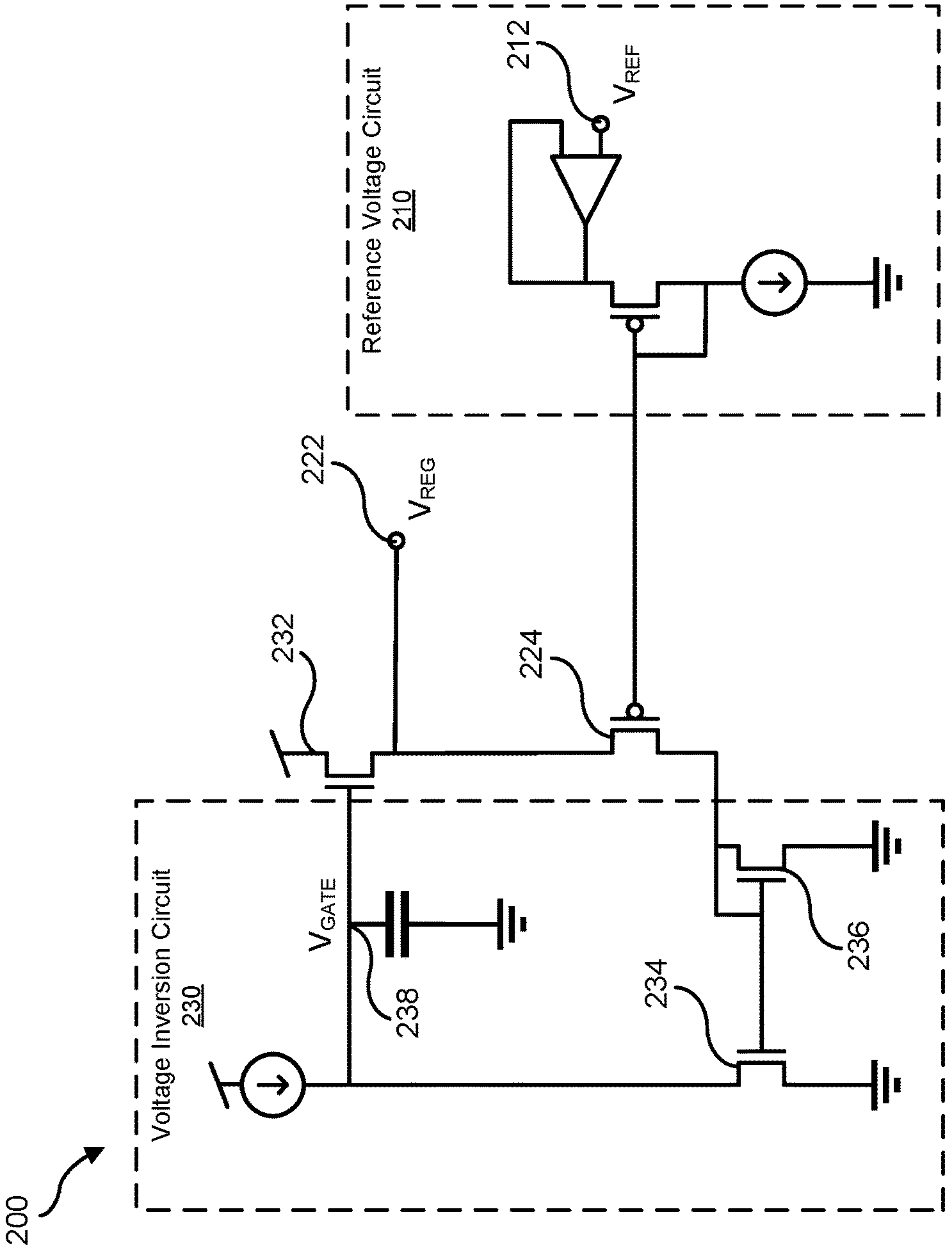
FIG. 2 is a simplified circuit diagram of an example voltage regulator circuit having an NMOS.
Figure 3:
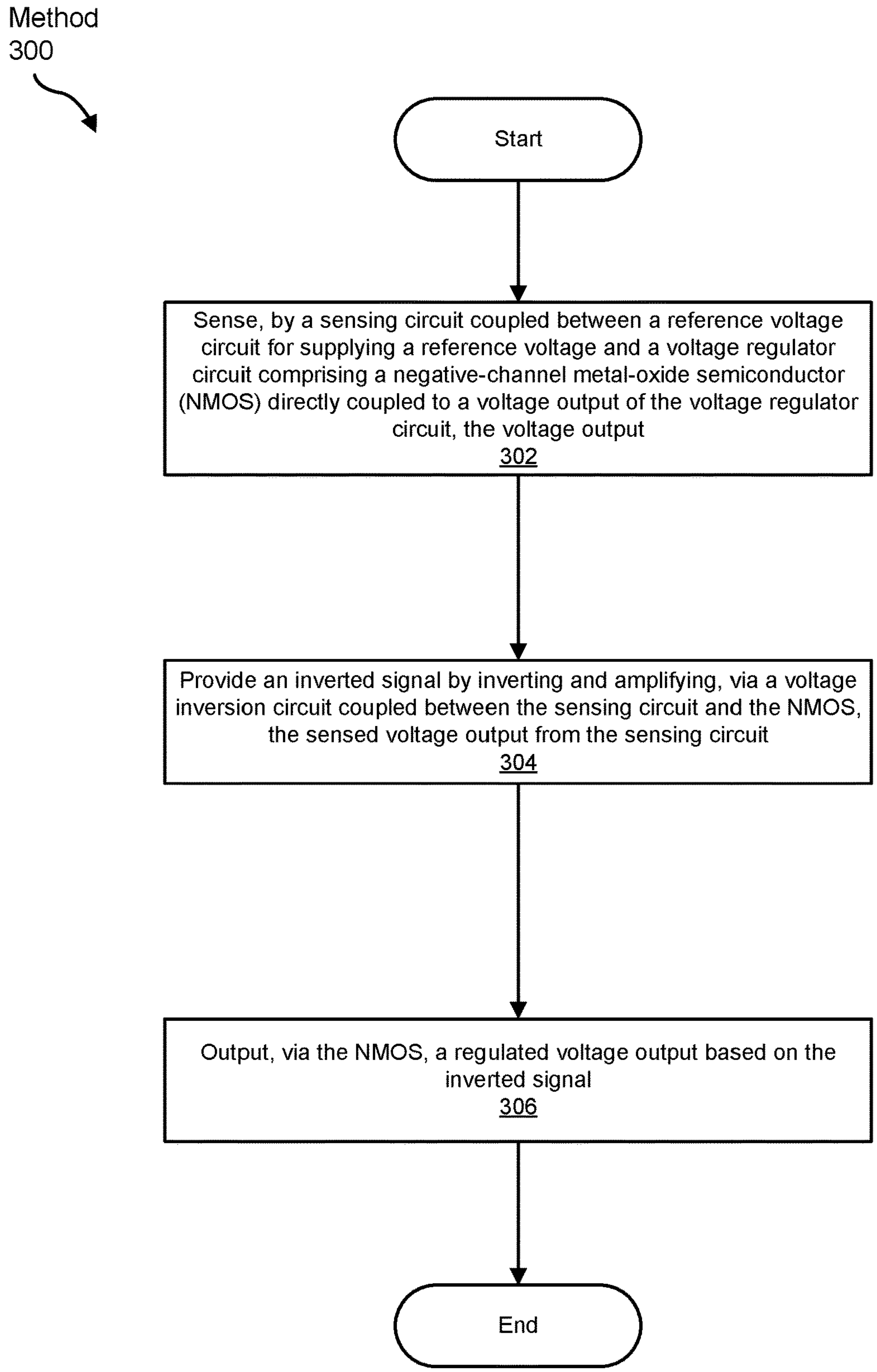
FIG. 3 is a flow diagram of an exemplary method for voltage regulation using an NMOS-based voltage regulator circuit.

The following will provide, with reference to FIGS. 1-3, detailed descriptions of voltage regulator circuits having an NMOS-based output. Detailed descriptions of example voltage regulator circuit will be provided in connection with FIGS. 1-2. Detailed descriptions of corresponding methods will also be provided in connection with FIG. 3.

FIG. 1 illustrates an example voltage regulator circuit 100 for providing a regulated voltage output 122. Voltage regulator circuit 100 includes a reference voltage circuit 110 for supplying a reference voltage 112. Voltage regulator circuit 100 also includes a flipped-source follower circuit 124 and further a capacitor 126 and a PMOS 132 coupled to regulated voltage output 122. Although FIG. 1 illustrates an example voltage regulator circuit, implementing voltage regulator circuit 100 can be prohibitive or otherwise restricted in some applications. For example, certain devices can have size restrictions that prevent placing capacitor 126, which can be a large capacitor and/or a capacitor array. Omitting capacitor 126 can preclude implementing PMOS 132 with flipped-source follower circuit 124.

FIG. 2 illustrates an example voltage regulator circuit 200 addressing certain disadvantages of voltage regulator circuit 100 as described herein. Voltage regulator circuit 200 provides a regulated voltage output 222 and also includes a reference voltage circuit 210 for supplying a reference voltage 212. Voltage regulator circuit 200 further includes a flipped-source follower circuit 224 (e.g., a sensing circuit that can sense variations to regulated voltage output 222). Reference voltage circuit 210 includes an op-amp in a follower configuration with a flipped PMOS current mirror for providing a correct bias voltage to flipped-source follower circuit 224.

As illustrated in FIG. 2, flipped-source follower circuit 224 can include a PMOS and is configured to invert reference voltage 212 provided by reference voltage circuit 210. For example, flipped-source follower circuit 224 can provide an inverting gain of reference voltage 212 as well as a non-inverting gain of regulated voltage output 222, as described further herein. Reference voltage circuit 210 provides a correct bias (e.g., from reference voltage 212) to flipped-source follower circuit 224. In other implementations, flipped-source follower circuit 224 can correspond to other components as needed.

In contrast to FIG. 1, voltage regulator circuit 200 does not have a capacitor coupled to regulated voltage output 222. Voltage regulator circuit 200 does not require a capacitor coupled to regulated voltage output 222 because voltage regulator circuit 200 does not require any explicit capacitance to either keep the feedback loop stable or to improve the PSRR. In addition, rather than a PMOS coupled to regulated voltage output 222 (as in FIG. 1), an NMOS 232 is directly coupled to regulated voltage output 222. As described herein, an NMOS (e.g., NMOS 232) directly coupled to regulated voltage output 222 can provide performance benefits over a PMOS. For instance, by using an NMOS, a capacitor is not required at regulated voltage output 222. Because the PSRR is better for an NMOS-based voltage regulator than a PMOS-based voltage regulator, capacitors (particularly large capacitors) are not needed on the regulated supply node to get a good PSRR. The lack of large capacitors allow a much wider bandwidth of the feedback loop including the flipped source follower and current mirror and therefore provides a much faster settling time.

In order to implement NMOS 232 with flipped-source follower circuit 224, voltage regulator circuit 200 includes a voltage inversion circuit 230 for inverting the inverted reference voltage from flipped-source follower circuit 224. In some examples, voltage inversion circuit 230 corresponds to an inverting gain stage that provides a gain for the whole feedback loop such that regulated voltage output 222 correctly follows reference voltage 212. Voltage inversion circuit 230 can include various circuits as needed, such as a current mirror. As illustrated in FIG. 2, voltage inversion circuit corresponds to an NMOS-based current mirror.

During operation, any variation of regulated voltage output 222 (e.g., $V_{REG}$) can be sensed by flipped-source follower circuit 224 and amplifies the sensed regulated voltage output 222 without inverting it. Voltage inversion circuit 230 and more specifically the NMOS current mirror (e.g., an NMOS 234 and an NMOS 236) inverts this amplified signal (e.g., the amplified regulated voltage output 222), which is inverted and amplified at a node 238 (e.g., $V_{GATE}$), which drives or controls NMOS 232. The inversion of the feedback loop (e.g., provided by the current mirror of NMOS 234) can create negative feedback, which can drive the power device (e.g., NMOS 232) with the correct polarity. A dominant pole can be set on node 238 ($V_{GATE}$). Because all nodes along the feedback loop are low impedance, voltage regulator circuit 200 can achieve stability with a very small capacitance.

Although FIG. 2 illustrates an inverting flipped-source follower (e.g., flipped-source follower circuit 224), in other implementations, the flipped-source follower can be a non-inverting flipped-source follower and/or any other sensing circuit.

Because NMOS 232 provides a high impedance path from supply to regulated supply $V_{REG}$ and a low impedance path from $V_{GATE}$ to the regulated supply $V_{REG}$, the PSRR is much better than for PMOS-based regulators.

FIG. 3 is a flow diagram of an exemplary method 300 for voltage regulation using an improved voltage regulator circuit. The steps shown in FIG. 3 can be performed by any suitable device, including the system(s) illustrated in FIG. 2. In one example, each of the steps shown in FIG. 3 represent an algorithm whose structure includes and/or is represented by multiple sub-steps, examples of which will be provided in greater detail below.

As illustrated in FIG. 3, at step 302 one or more of the systems described herein senses, by a sensing circuit (e.g., a flipped-source follower circuit) coupled between a reference voltage circuit for supplying a reference voltage (e.g., a correct bias) and a voltage regulator circuit comprising a negative-channel metal-oxide semiconductor (NMOS) directly coupled to a voltage output of the voltage regulator circuit, the voltage output. For example, flipped-source follower circuit 224 can sense regulated voltage output 222. In some examples, reference voltage circuit 210 can supply reference voltage 212 as the correct bias for flipped-source follower circuit 224 such that flipped-source follower circuit 224 amplifies, without inverting, the sensed voltage output.

At step 304 one or more of the systems described herein provides an inverted signal by inverting and amplifying, via a voltage inversion circuit coupled between the sensing circuit and the NMOS, the sensed voltage output from the sensing circuit. For example, voltage inversion circuit 230 inverts and amplifies the sensed voltage output from flipped-source follower circuit 224 to provide the inverted signal (e.g., at node 238). More specifically, in some examples the current mirror (e.g., NMOS 234 and NMOS 236) provides an inverting gain stage.

At step 306 one or more of the systems described herein outputs, via the NMOS, a regulated voltage based on the inverted signal. For example, voltage regulator circuit 200 (e.g., voltage inversion circuit 230 and more specifically the current mirror of NMOS 234 and NMOS 236) provides the inverted signal at node 238 which then controls NMOS 232 to output regulated voltage output 222.

As detailed above, the present disclosure provides for a voltage regulator with very fast settling time, excellent PSRR, and very small area footprint. Fast settling regulators can be critical for power management optimization. Use of numerous supply domains can pose stringent requirements on area and overhead current.

Example voltage regulators exploiting flipped/super-source-followers are typically PMOS-based, e.g., the main power device that provides the load current and sets the regulated supply is a PMOS transistor. However, such regulators are known for very poor PSRR over the full spectrum and can even cause supply noise amplification. Improvements in PSRR often come at the expense of large capacitances and higher currents to drive them.

Conversely, NMOS-based voltage regulators can provide superior PSRR over the full spectrum. Thus, the systems and methods described herein exploit the benefits of the flipped-source-follower for a fast settling time (e.g., <1 nanosecond) and utilize an NMOS-based voltage regulator for an excellent PSRR (e.g., better than 20 dB). Thus, by avoiding large capacitances to achieve a good PSRR, the circuit remains very fast and consumes little current. The wideband feedback loop with small compensation and decoupling capacitances allows fast settling transients, little quiescent current and a small footprint.

The NMOS-based voltage regulator described herein can achieve the very fast settling time by employing a local feedback loop based on the flipped-source follower. The excellent PSRR is possible due to the superior isolation of NMOS-based regulators. The small area footprint is possible because the wideband local feedback loop and the superior PSRR of the NMOS-based regulator allows having a stable loop and excellent PSRR over the full spectrum with very little compensation and load capacitances.

Finally, the small overhead current (e.g., regulator core current), is possible because the circuit is designed to avoid most slewing conditions. Thus, high current is present on-demand during the fast settlings while maintaining a low stand-by current.

Accordingly, the architecture described herein allows combining the very fast settling flipped-source-follower topology with an NMOS-based voltage regulator, thus achieving very fast settling time and excellent PSRR at the same time.

As detailed above, the devices and systems described and/or illustrated herein broadly represent any type or form of circuit, such as for a computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A voltage regulator circuit comprising:

a negative-channel metal-oxide semiconductor (NMOS) coupled to a regulated voltage output of the voltage regulator circuit;

a sensing circuit for sensing the regulated voltage output;

a reference voltage circuit for supplying a correct bias voltage to the sensing circuit; and a voltage inversion circuit coupled between the sensing circuit and the NMOS, wherein the voltage inversion circuit lacks a resistor.

2. The voltage regulator circuit of claim 1, wherein the sensing circuit comprises a flipped-source follower circuit coupled between the voltage inversion circuit and the reference voltage circuit and configured to amplify the sensed regulated voltage output.

3. The voltage regulator circuit of claim 2, wherein the flipped-source follower circuit comprises a positive-channel metal-oxide semiconductor (PMOS).

4. The voltage regulator circuit of claim 2, wherein the flipped-source follower circuit is configured to invert the reference voltage supplied by the reference voltage circuit.

5. The voltage regulator circuit of claim 4, wherein the voltage inversion circuit is configured to invert the inverted reference voltage from the flipped-source follower circuit.

6. The voltage regulator circuit of claim 5, wherein the regulated voltage output at the NMOS is not coupled to a capacitor.

7. The voltage regulator circuit of claim 1, wherein the voltage inversion circuit comprises a current mirror providing an inverting gain stage for the sensed regulated voltage output.

8. The voltage regulator circuit of claim 7, wherein the current mirror corresponds to an NMOS-based current mirror.

9. The voltage regulator circuit of claim 1, wherein the NMOS is directly coupled to the regulated voltage output.

10. A device comprising:

a negative-channel metal-oxide semiconductor (NMOS) coupled to a regulated voltage output of a voltage regulator circuit;

a flipped-source follower circuit coupled between a reference voltage circuit and the NMOS for sensing the regulated voltage output;

the reference voltage circuit for supplying a correct bias to the flipped-source follower circuit; and a voltage inversion circuit coupled between the flipped-source follower circuit and the NMOS, wherein the voltage inversion circuit lacks a resistor.

11. The device of claim 10, wherein the flipped-source follower circuit comprises a positive-channel metal-oxide semiconductor (PMOS).

12. The device of claim 10, wherein the flipped-source follower circuit is configured to invert the reference voltage supplied by the reference voltage circuit.

13. The device of claim 12, wherein the voltage inversion circuit is configured to invert the inverted reference voltage from the flipped-source follower circuit.

14. The device of claim 10, wherein the voltage inversion circuit comprises a current mirror providing an inverting gain stage of the sensed regulated voltage output.

15. The device of claim 14, wherein the current mirror corresponds to an NMOS-based current mirror.

16. The device of claim 10, wherein the NMOS is directly coupled to the regulated voltage output.

17. The device of claim 16, wherein the regulated voltage output at the NMOS is not coupled to a capacitor.

18. A method comprising:

sensing, by a sensing circuit coupled between a reference voltage circuit for supplying a reference voltage and a voltage regulator circuit comprising a negative-channel metal-oxide semiconductor (NMOS) directly coupled to a voltage output of the voltage regulator circuit, the voltage output;

providing an inverted signal by inverting and amplifying, via a voltage inversion circuit coupled between the sensing circuit and the NMOS, the sensed voltage output from the sensing circuit, wherein the voltage inversion circuit lacks a resistor; and outputting, via the NMOS, a regulated voltage output based on the inverted signal.

19. The method of claim 18, further comprising supplying, by the reference voltage circuit, a correct bias to the sensing circuit.

20. The method of claim 18, further comprising amplifying without inverting, by the sensing circuit, the sensed voltage output.

* * * * *